(12) United States Patent
Bazaj et al.

(10) Patent No.: US 6,281,291 B1
(45) Date of Patent: *Aug. 28, 2001

(54) PAPER OR BOARD TREATING COMPOSITION OF CARBOXYLATED SURFACE SIZE, POLYACRYLAMIDE AND CROSSLINKER

(75) Inventors: Rajiv Bazaj, Stamford; Gerald Guerro, Trumbull; David Dauplaise, Stamford, all of CT (US)

(73) Assignee: Bayer Corporation, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/476,214

(22) Filed: Dec. 30, 1999

Related U.S. Application Data

(63) Continuation of application No. 08/692,731, filed on Aug. 6, 1996, now Pat. No. 6,034,181.
(60) Provisional application No. 60/003,274, filed on Aug. 25, 1995.

(51) Int. Cl.[7] ............................ C08L 33/02; C08L 33/20; C08L 33/26; D06M 15/00; D21H 25/102
(52) U.S. Cl. .................. 525/218; 8/183; 8/194; 162/166; 162/168.3; 524/510; 524/521; 525/155; 525/163; 525/194
(58) Field of Search .................. 524/521, 510; 525/218, 155, 163, 194; 8/183, 194; 162/166, 168.3

(56) References Cited

U.S. PATENT DOCUMENTS

| | | | |
|---|---|---|---|
| 3,562,102 | 2/1971 | Gaertner | 162/168 |
| 3,980,800 | 9/1976 | Nagy | 526/23 |
| 4,036,682 | 7/1977 | Chan et al. | 162/167 |
| 4,115,331 | 9/1978 | Tominaga et al. | 260/17.4 |
| 4,294,704 | 10/1981 | Daniel | 210/651 |
| 4,439,496 | 3/1984 | Tamagawa et al. | 428/513 |
| 4,442,172 | 4/1984 | Oshima et al. | 428/342 |
| 4,855,343 | 8/1989 | Degen et al. | 524/47 |
| 4,900,620 | 2/1990 | Tokita et al. | 428/330 |
| 5,122,568 | 6/1992 | dePieme et al. | 524/824 |
| 5,126,010 | 6/1992 | Kobayashi et al. | 162/135 |
| 5,138,004 | 8/1992 | dePieme et al. | 526/293 |
| 5,139,614 | 8/1992 | dePieme et al. | 162/135 |
| 5,219,912 | 6/1993 | Takahashi et al. | 524/321 |
| 5,320,897 | 6/1994 | Kondo et al. | 428/195 |
| 5,362,573 | 11/1994 | Pandian et al. | 428/511 |
| 5,372,884 | 12/1994 | Abe et al. | 428/331 |
| 5,438,087 | 8/1995 | Ikeda et al. | 524/272 |
| 5,698,305 | 12/1997 | Suzuki et al. | 428/219 |
| 6,034,181 | * 3/2000 | Bazaj et al. | 525/218 |

FOREIGN PATENT DOCUMENTS

| | | |
|---|---|---|
| 1101158 | 5/1981 | (CA) . |
| 3413447 | 10/1984 | (DE) . |
| 19548927 | 11/1996 | (DE) . |
| 600245 | 6/1995 | (EP) . |
| 2268758 | 1/1994 | (GB) . |
| 54-073910 | 6/1979 | (JP) . |
| 61-09783 | 1/1980 | (JP) . |
| 57-139598 | 9/1982 | (JP) . |
| 57-139599 | 9/1982 | (JP) . |
| 57-191397 | 11/1982 | (JP) . |
| 1-20541 | 1/1989 | (JP) . |
| 64-1778 | 1/1989 | (JP) . |
| 6-8617 | 6/1992 | (JP) . |
| 5-173287 | 7/1993 | (JP) . |
| 6-143799 | 5/1994 | (JP) . |
| 6-287503 | 10/1994 | (JP) . |
| 7-26495 | 1/1995 | (JP) . |
| 7-3697 | 1/1995 | (JP) . |

\* cited by examiner

Primary Examiner—Robert E. L. Sellers

(57) ABSTRACT

A composition useful in paper and board making comprises a carboxylated surface size containing at least 40 mole percent of hydrophobic groups and at least about 25 mole percent of carboxylated groups such as styrene-(meth) acrylic aicd copolymers or styrene-maleic acid (anhydride or salt) copolymers, a hydrophilic polyacrylamide and a crosslinking agent such as glyoxylated vinylamide polymers, formaldehyde, melamine-formaldehyde condensates and glyoxyl-extended materials.

20 Claims, No Drawings

PAPER OR BOARD TREATING COMPOSITION OF CARBOXYLATED SURFACE SIZE, POLYACRYLAMIDE AND CROSSLINKER

This is a continuation of application Ser. No. 08/692,731, filed Aug. 6, 1996, now U.S. Pat. No. 6,034,181, which claims the benefit of provisional application Ser. No. 60/003,274 filed Aug. 25, 1995.

FIELD OF THE INVENTION

This invention relates to compositions and methods for improving the printability and/or strength of various types of paper and board. More specifically, this invention relates to mixtures of hydrophobic surface sizes and hydrophilic polyacrylamide which, when added to paper or board, improve print quality, sizing, as well as surface strength of the paper or board.

BACKGROUND OF THE INVENTION

Sizing agents have gained wide acceptance in the paper industry for modifying paper to improve its resistance to penetration by liquids, generally water, and to improve various aspects of printability. For example, U.S. Pat. Nos. 5,122,568 and 5,139,614 teach the use of styrene acrylic copolymers for enhancing sizing, inkprint contrast, increasing ink penetration times and reducing feathering. U.S. Pat. No. 3,562,102 discloses amine reaction products of alkyl glycidyl mixed esters which are used in the preparation of sized cellulosic paper substrates, cured films and solid resinous potting compositions.

Efforts have been made to develop improved sizing agents. In U.S. Pat. No. 4,855,343 acrylonitrile acrylate monomers are copolymerized by emulsion polymerization in the presence of degraded starch and a peroxide-containing initiator to provide improved paper sizing agents. U.S. Pat. No. 5,362,573 describes the use of, titanium, hafnium and zirconium salts such as ammonium zirconium carbonate in conjunction with surface sizing compound containing water-soluble hydroxylated polymer to improve sizing efficiency.

There are many different sizing agents used in papermaking, such as rosin soap, starch, sodium silicate, amine reaction products of alkyl glycidyl mixed esters, such as that described in U.S. Pat. No. 3,562,102, for example, and sizing can be accomplished by either internal sizing processes, which typically involve wet end addition, or surface sizing processes, which typically involve addition at the size press. Surface treatment at the size press typically with sizing agents alters the paper web primarily by imparting an increased degree of hydrophobicity. This sizing effect, in turn, generates higher ink penetration time values, reduced lateral spread of printing inks, as well as improved imaging and contrast with various printing technologies.

Thus, hydrophobic surface size agents improve printability primarily by decreasing paper sheet absorbtivity and enhancing surface resistance to liquid (ink) penetration.

Paper printability and other qualities have also been improved through the use of coated paper and various ink jet recording sheets. In U.S. Pat. No. 4,442,172, an ink jet recording sheet made by coating a water-soluble polymer onto the surface of a base sheet containing synthetic silicate, wet strength additive and glass fiber is described as having superior ink absorbency and high recording density without feathering. Combinations of alkyl ketene dimer internal sizing agent, precipitated calcium carbonate and certain cationic synthetic fixing agents have also been incorporated into ink jet recording base layers, see, U.S. Pat. No. 5,126,010. Ink jet recording paper described in JP 06143799 is prepared by applying a surface size treatment of high molecular weight adhesive and styrene-maleic anhydride copolymer to both sides of base paper and disposing an ink-receiving coating containing a white pigment and adhesive on one side of the paper. Ink jet recording transfer sheets containing calcium carbonate as a filler and alkyl ketene dimer or alkenyl succinic anhydride as sizing agents are described in JP 06008617. Auxiliary agents such as starch, polyacrylamide and polyvinylalcohol may be included in the transfer sheet. J56109783-A describes paper for ink jet recording obtained by applying a hydrophilic polymer, e.g., oxidized starch or polyvinyl alcohol, to raw paper of specified water absorption degree to provide paper with balanced ink drying properties and blotting resistance for ink-jet printing. And U.S. Pat. No. 4,900,620 describes ink jet recording. sheets having good ink absorption, resolution and color brightness which are made of wood pulp and precipitated calcium carbonate substrate coated with a layer of white pigment. Ink jet recording sheets composed of a support and a cation-modified acicular or fibrous colloidal silica-containing ink-receiving layer are described in U.S. Pat. No. 5,372,884; various polymers may be included in the ink receiving layer for improving ink drying properties, film-forming properties and image sharpness.

In U.S. Pat. No. 4,294,704 paper and board is coated with compositions containing aqueous latex binders of synthetic polymer such as styrene-butadiene copolymers, carboxyl styrene-butadiene copolymers, vinyl polyacetates, carboxyl vinyl polyacetates, alkyl acrylate-vinyl acetate copolymers and carboxyl alkyl acrylate-vinyl acetate copolymers in order to provide improved dry and wet tear resistance. In U.S. Pat. No. 4,439,496 a water-resistant photographic substrate containing an alkylketene dimer, a cationic polyacrylamide and an anionic polyacrylamide is coated with a water resistant polyolefin.

JP05173287 discloses base paper for use in photographic printing paper which is made by adding a cationic polyacrylamide to pulp slurry, then adding a sizing agent which has an effect in the weakly acidic to weakly alkaline pH region, e.g., high organic ketene dimers, and finally adding an anionic polyacrylamide; the base paper is described as being useful in inhibiting the permeation of developing liquids from the cut end surfaces of the photographic printing paper. Another ink jet recording sheet is described in EP 600245.

As new printing technologies continue to emerge and gain acceptance in the market place, the need for developing high performance paper surfaces having improved printability characteristics increases. Despite the benefits obtained from using coated paper or ink jet recording sheets, these materials have certain disadvantages, for example, they require two separate layers and therefore their manufacture involves numerous paper processing steps and special converting operations. Furthermore, many of the existing coated paper sheets exhibit inadequate color image, color resolution and color bleed. Moreover, as paper products increasingly use multiple colored inks, paper exhibiting controlled ink absorption, optimal color density and reduced color bleed, and with reduced feathering and wicking has been particularly difficult to make. It is desirable, in many instances, to use single sheets of paper having superior color absorption rates, color density and resolution With reduced color bleed and feathering.

Consequently, a need, unsatisfied by existing technology, has developed for a paper additive that provides the above-described benefits in printability and sizing yet also exhibits superior dry strength.

Existing dry strength additives have not met this need. N-(chloroalkoxymethyl) acrylamides and quaternized derivatives thereof are dry strength additives described in U.S. Pat. No. 3,980,800. Canadian patent 1101158 describes improved dry strength properties obtained by admixing a fibre suspension with quaternized acrylamide polymers. The addition of acetone-triethylenetetramine-diethylenetriamine-formaldehyde copolymer and acrylamide-maleic anhydride copolymer to cellulose pulp is described in U.S. Pat. No. 4,036,682 as giving increased strength properties. Polyvinyl alcohol and starch have been applied to paper to improve sheet surface characteristics which may included surface strength, and porosity smoothness. In JP 57139599 and JP 139598 anionic polyacrylamide is added at the wet end and a sizing agent selected from alkyl ketene dimer, cationic sizing agent and substituted cyclic dicarboxylic anhydride is used along with aluminum salt to manufacture neutral paper purportedly having good wet and dry tenacity.

Various printing technologies continue to require paper surfaces with high integrity and resistance to the abrasive effects of the printing processes. Fiber picking, Tinting and filler dusting all contribute to decreased runnability of paper on impact printing processes. There therefore exists a need for surface treatment agents which overcome these surface defects.

It has now been discovered that a generally hydrophobic surface size additive and a hydrophilic dry strength agent, preferably polyacrylamide, may be combined in a single composition to provide, when added to paper or board sheet surfaces at the size press, synergistically improved sizing and strength as well as a wide range of improved paper printability properties. It was surprising to find that a hydrophilic agent such as polyacrylamide could be combined with a hydrophobic surface size as a pre-mix and that improved strength, sizing and printability properties resulted from use of that pre-mix in paper or board including paperboard. This was particularly unexpected given that hydrophobic surface size agents, in theory, increase the degree of hydrophobicity of the sheet and thus decrease paper absorptivity while hydrophilic ≅terials such as polyacrylamide increase the degree of hydrogen boding in the paper sheet and maintain high sheet absorbitivity of liquid. Paper or board made using the compositions of the instant invention exhibit sizing properties which are superior to the use of the hydrophobic surface size agent alone. Thus, by admixing polyacrylamide with a surface sizing agent the sizing function is unexpectedly improved. A further benefit provided by the compositions of the instant invention is synergistically improved strength properties, such as internal bond strength and wax pick. In addition, paper and board comprising the surface size polyacrylamide mixtures of the instant invention exhibit synergistic improvements in print quality, e.g., controlled ink absorbency, ink drying time and color optical density; sharper half-tone dots are produced with maximized light scatter for improved print contrast. The products of the instant invention impart substantial resistance to penetration of ink and aqueous liquids to said paper, provide processing flexibility by allowing the papermaker to balance the size requirements between internal and surface sizing, increase the contact angle and surface strength, maintain the sizing level over time and impact the coefficient of friction. Other benefits relating to printability such as improved image resolution and reduced color bleed, bleed through, feathering, wicking, picking, Tinting and dusting are also achieved by the instant invention. The superior image resolution and bleed through properties provided by the compositions of the instant invention are particularly desirable for use in connection with modem printing technologies which use a variety of different color inks. Advantageously, the above benefits are provided by a single sheet of uncoated paper or board without having to produce a more complicated and costly multilayer paper or board, e.g. coated paper or base paper with an ink receiving layer.

The surface size materials used in the instant invention are generally synthetic, preferably, though not necessarily, water soluble, and are primarily hydrophobic, preferably containing at least about 30 mole percent hydrophobic groups, while the acrylamide polymers with which they are combined are substantially hydrophilic, preferably containing at least about 25 mole percent, more preferably at least about 50 mole percent hydrophilic monomer groups such as the amide group in polyacylamide. The surface size and polyacrylamide material must be premixed prior to application to the paper. The polyacrylamide surface size mixtures of the instant invention may be added alone as a water solution in dispersion or in combination with commonly applied paper additives such as size press starches. The compositions of the present invention may be used in the production of board such as boxboard, linerboard and bleached board, e.g. milk carton, as well as various types of paper such as, for example uncoated, woodfine papers, packaging, newsprint, and ledger. The paper and board of the instant invention is especially useful for paper or board which is designed to be or capable of being printed in its end use, i.e. printing paper or board.

In yet a further embodiment of the present invention compositions comprising a hydrophobic surface size agent, a hydrophilic polyacrylamide and a cross-linking agent, such as, for example, ammonium zirconium carbonate, are provided and when applied to paper or board, at the size press, or the like, further improve printability, both non-impact and impact printability, internal dry strength, and surface strength, e.g. tensile strength, burst, and wax pick.

SUMMARY OF INVENTION

In a broad sense, the instant invention provides compositions comprising substantially hydrophobic surface size and a substantially hydrophilic material such as polyacrylamide which may be used in paper or board making to impart improved sizing, internal bond strength and print characteristics. The instant invention provides compositions, preferably aqueous compositions, comprising a mixture, preferably a dispersion, of synthetic preferably carboxylated surface size containing at least about 40 mole percent hydrophobic groups and water-soluble polyacrylamide, wherein the ratio of said surface size to said polyacrylamide is from about 30-95 parts by weight surface size to about 70-5 parts by weight polyacrylamide. Preferred surface size agents include hydrolyzed styrene maleic anhydride copolymers, styrene maleic acid salt copolymers, styrene maleic ester copolymers, styrene (meth)acrylate copolymers, styrene (meth)acrylate ester copolymers, styrene acrylate ester acrylonitrile terpolymers, acrylonitrile (meth)acrylate salt copolymers and polyurethanes. A further embodiment of the present invention provides compositions, preferably aqueous compositions, comprising a mixture of synthetic carboxylated polymeric surface size containing at least about 40 mole percent hydrophobic groups and hydrophilic polyacrylamide in the ratios described along with an effective amount of stabilizing agent and/or crosslinking agent. Paper or board comprising the above-described compositions of the present invention are also provided. In a preferred embodiment there is provided paper or board, preferably uncoated paper or board, comprising:

(i) synthetic, carboxylated surface size containing at least 40 mole percent hydrophobic groups and (ii) substantially hydrophilic polyacrylamide, wherein the ratio of said surface size to said polyacrylamide is from about 30-95 parts by weight surface size to about 70-5 parts by weight polyacrylamide.

Also, there is provided a method for improving the printability and/or strength of printing paper or board, preferably uncoated paper or board, which comprises:

applying to the surface of paper or board, using a size press, calendar, or spray boom, a mixture comprising:

(i) synthetic surface size containing at least about 40 mole percent hydrophobic groups; and (ii) substantially hydrophilic polyacrylamide;

wherein the ratio of said surface size to said polyacrylamide is from about 30-95 parts by weight surface size to about 70-5 parts by weight polyacrylamide.

Also provided are methods for improving the printability and/or strength of uncoated paper or board which comprise:

1) adding to a liquid medium in any order:

(a) a mixture comprising:

(i) synthetic, carboxylated polymeric surface size containing at least 40 mole percent hydrophobic groups; and (ii) substantially hydrophilic polyacrylamide wherein the ratio of said surface size to said polyacrylamide is from bout 30-95 parts by weight surface size to about 70-5 parts by weight polyacrylamide; and (b) an effective amount of crosslinking agent to form a dilute mixture;

wherein the weight ratio of liquid medium to said mixture ranges from about 70-99 parts liquid medium to about 30-1 parts mixture; and 2) applying said dilute mixture formed in step (1) to the surface of paper or board using a size press, calendar, or spray boom.

DETAILED DESCRIPTION OF THE INVENTION

The above and related objects of the present invention are achieved by producing a mixture, preferably an aqueous mixture, preferably a dispersion, comprising surface size containing at least about 30 mole percent, preferably at least about 40 mole percent hydrophobic groups, based on total moles in the sizing agent and a dry strength agent, generally a water-soluble or hydrophilic polyacrylamide. Surface size materials are any polymer that imparts sizing or liquid hold out. Generally surface size are non-ionic or anionic, preferably anionic. Suitable surface sizes are preferably polymeric, usually carboxylated, i.e., containing carboxyl groups, generally at least about 25 mole percent carboxyl groups, preferably at least about 50 mole percent, more preferably at least about 60 mole percent carboxyl groups, based on the sizing agent. Any synthetic surface size may be used, including non-polymeric agents, e.g. alkylketene dimers as long as they impart hydrophobic character to the paper surface, Representative examples of suitable surface size polymers useful in the instant invention include copolymers of styrene and maleic anhydride or copolymers derived from styrene maleic anhydride such as styrene maleic acid salts, hydrolyzed styrene maleic anhydride, and styrene maleic ester copolymers, as well as styrene (meth)acrylate copolymers, styrene (meth)acrylate acrylonitrile terpolymers, styrene (meth)acrylic acid copolymers, acrylonitrile (meth)acrylate salt copolymers, polyurethanes, mixtures thereof and the like. Usually the surface size materials contain at least about 40 mole percent hydrophobic groups, preferably at least about 50 mole percent hydrophobic groups, more preferably at least about 53 mole percent hydrophobic groups. Representative examples of hydrophobic groups include subunits such as styrene and α-methyl styrene, mixtures thereof and the like. The surface size materials are preferably water-soluble. The molecular weight of the surface size polymers used in the present invention is not critical and generally ranges from at least about 30,000 as determined by high pressure size exclusion chromatography. The acrylamide polymers useful in the instant invention are generally water-soluble and may be water-swellable. All (alk)acrylamide polymers are encompassed in the present invention such as acrylamide, methacrylamide, ethacrylamide and the like. The term polyacrylamide for purposes of this invention includes all (alk) acrylamide homopolymers as well as copolymers and functionalized polyacrylamides. The polyacrylamides may be anionic, cationic or nonionic, although, generally, cationic and anionic are more preferred. Various monomers, preferably ethylenically unsaturated monomers may be copolymerized with (alk)acrylamide monomers to form the polyacrylamides used in the instant invention. Representative cationic monomers include dialkylammonium chlorides, N,N-dialkylaminoalkyl(meth)acrylates, N,N-dialkylaminoalkyl(meth)acrylamides, salts, quaternaries and mixtures thereof. Anionic monomers useful in the practice of this invention may comprise acrylic or methacrylic acid, furmaric acid, crotonic acid, maleic acid, salts thereof, 2-acrylamido-2-methylpropane sulfonic acid, styrene sulfonic acid and their salts and the like. Water-soluble nonionic monomers suitable in the practice of this invention, generally comprise N-vinyl pyrrolidone, N,N-dialylmethacrylamides, hydroxyalkyl methacrylates; N-vinylformamide and the like. Small quantities of other copolymerizable monomers, such as methyl acrylate; methyl methacrylate, acrylonitrile; vinyl acetate; styrene etc, may also be used.

Generally anionic and nonionic comonomers may be included in the acrylamide copolymers in amounts up to about 20 mole percent, preferably about 10 mole percent, based on the copolymer. Cationic comonomers may be included in the acrylamide copolymers in amounts up to about 15 mole percent, preferably up to about 10 mole percent, based on the copolymer. Preferable polyacrylamides include acrylamide homopolyrriers, copolymers of acrylamide which preferably contain from about 1 to about 20 mole percent anionic or cationic comonomers as well as hydrolyzed polyacrylamide. Representative examples of preferred polyacrylamides include copolymers of acrylamide with acrylate esters, acrylate salts, including sodium, potassium and ammonium salts, acrylic acid, diallyldimethylammonium chloride and the like. The various types of polyacrylamides may be used alone or in combinations of two or more. Copolymers of acrylamide and sodium acrylate are generally most preferred, more preferably those containing from about 1 to about 20 acrylate salt, most preferably about 5 to about 10 acrylate salt. It is desirable that the polyacrylamides used herein be substantially hydrophilic, generally containing at least about 30 mole percent hydrophilic groups, preferably at least about 50 mole percent hydrophilic groups, based on polyacrylamide, more preferably at least about 75 mole percent hydrophilic groups, e.g., non-akylated acrylamide. The molecular weight of polyacrylamides used herein is not critical, though a molecular weight as high as possible is usually preferred, typically at least about 50,000, preferably at least about 300,000 and polyacrylamides typically can have a molecular weight up to about 500,000, more preferably up to about 100,000. Polyacrylamides may be crosslinked with crosslinking agents known in the art such as, for example those agents described hereinafter.

It is important in providing the benefits of the instant invention that the polyacrylamide and surface size is premixed before application to the paper or board. Polyacrylamides are typically available in aqueous solution form and it is preferred, in preparing the compositions of the instant invention, to adjust the pH of the aqueous polyacrylamide-containing solution to an alkaline pH, generally a pH of at least about 8 preferably at least about 9, prior to admixing it with the surface size. Preferably the pH of the aqueous solution of polyacrylamide is adjusted to a pH ranging from about 8 to about 11, more preferably about 9 to about 10. It is most desirable to adjust the pH of the aqueous solution of polyacrylamide to a pH that is substantially the same as that of the surface size, which also typically is available in solution, preferably aqueous, form. Generally this is a pH that is within about 1 pH unit. While it is not essential to combine the polyacrylamide and surface size as aqueous solutions, it is preferred. Similarly, it is not essential to adjust the pH of the aforesaid polymer solutions so that they are substantially similar, but it is preferred. When the pH of the polyacrylamide solution is substantially different from that of the aqueous solution of surface size, gel formation or agglomeration tends to occur.

While the pH of the surface size/acrylamide polymer-containing compositions of the present invention is not critical to performance, pH appears to affect physical properties of the composition; it is, therefore, generally preferred that the pH of the composition is at least about 8 or above about 8 preferably at least about 9 and up to about 11, preferably up to about 10. By adjusting the pH of the final composition within this range, the composition is less viscous, easier to handle and more stable. Thus the compositions of the present invention preferably have a pH ranging from about 8 to about 11, more preferably from about 9 to about 10; pH adjustments may be made prior to adding the composition to the paper or board but is preferably done after or during preparation of the composition. Typically any bases (or acids if the case may be) which are compatible with the particular surface size and acrylamide polymers may be used for pH adjustments, preferably hydroxide, carbonate, bicarbonate bases such as, for example, sodium hydroxide, sodium bicarbonate, sodium carbonate, lithium hydroxides, potassium hydroxide mixtures thereof and the like.

Generally the amount of polyacrylamide to be combined with surface size is not critical. Usually surface size and polyacrylamide are admixed in a ratio of from about 30-95 parts by weight surface size to about 70-5 parts by weight polyacrylamide, preferably from about 40-70 parts by weight surface size to about 60-30 parts by weight polyacrylamide, more preferably from about 50-60 parts by weight surface size to about 50-40 parts by weight polyacrylamide. While mixing the materials within the above-described ratios tends to provide a homogenous mixture which tends to not exhibit phase separation, the ratios described herein are not critical and may vary depending on the paper type, the properties desired and additional materials added to the aqueous composition; the optimal ratios for each papermaking system may be ascertained using simple experimentation. In mixing the surface size agent with polyacrylamide to prepare the compositions of this invention, the order of addition is not critical, though it is preferred to add the surface size to the polyacrylamide. The compositions can contain about 100 percent polymer or surface size which comprise most, if not all of the solids, though the compositions are preferably aqueous. The solids content of the aqueous composition should be at least about 0.5 weight percent, based on total weight of the composition and broadly ranges from about 0.5 to about 30 percent, by weight, preferably about 10 to about 22 percent, by weight, based on total weight of the composition. It is more preferred to dilute the surface size acrylamide polymer-containing composition with water to obtain at least about 12 percent solids, generally from about 12 to about 17 percent solids, preferably from about 13 to about 15 percent solids, by weight, based on total weight of the composition.

Generally, the compositions of the instant invention consist essentially of the above-described surface size and polyacrylamide, preferably the compositions consist of the previously discussed surface size and polyacrylamide in the ratios described above. Optionally, the surface size/polyacrylamide containing compositions preferably further contain an effective amount of stabilizing agent sufficient to reduce phase separation. Any agent that reduces phase separation is suitable as a stabilizing agent. Generally, cationic polyacrylamides, cationic homopolymers, such as polydiallyldimethyl ammonium chloride, polyhydroxyalkylamines and starch are preferred. Anionic polymers such as, for example, carboxymethylcellulose and phophoralated starches are also suitable stabilizing agents. Stabilizing agents may generally be added in amounts sufficient to prevent phase seperation, generally at least about 0.3 percent, preferably at least about 0.5 percent by weight, based on the weight of surface size and acrylamide polymer and up to about 5.0 percent, preferably up to about 3.0 percent by weight, based on the weight of surface size and acrylamide polymer. Accordingly, preferred amounts of stabilizing agent range from about 0.3 percent to about 5.0 percent, based on the total weight of surface size and polyacrylamide.

The paper and board that is produced acording to the instant invention may contain auxiliary materials known in the art as useful for incorporation into paper or board by adding them to the pulp at the wet end, directly to the paper or board or to a liquid medium, e.g. starch solution which is then used to impregnate paper sheets or board. Representative examples of auxiliary agents include defoamers, bacteriocides, pigments, fillers and the like. The addition of a crosslinking agent, generally a water soluble crosslinking agent is particularly preferred. It has been found that a crosslinking agent tends to enhance the improved sizing, strength and printability benefits provided by the surface size/polyacrylamide compositions. Generally any known crosslinking agent is useful in the instant invention, including those zirconium, hafnium or titanium salts described in U.S. Pat. No. 5,362,573 which is incorporated herein by reference, glyoxylated polymers such as glyoxylated vinylamide polymers, formaldehyde, melamine-formaldehyde condensation polymers and glyoxyl extended materials such as dihydroxyethylene urea. Ammonium zirconium carbonate (AZC) is particularly preferred. 1-he crosslinking agent may be added directly to the composition or mixture containing surface size and acrylamide polymer or, applied to paper or board during the paper/board making process, e.g., added directly to the paper or through use of a liquid medium such as water or aqueous starch solution at the size press. Crosslinking agent may be added to the liquid medium before, after or simultaneously with the polyacrylamide/surface size mixture. An effective amount of crosslinking agent sufficient to provide improved strength, sizing or printability properties should be used,. generally an amount of at least about 0.3 percent, preferably about 2.0 percent, by weight, based on total weight of surface size and acrylamide polymer; and generally no more than about 10.0 percent, preferably no more than about 5.0 percent, by weight, based on total surface size and acrylamide polymer; thus the range of crosslinking agent is generally from about 0.3 to about 10.0 percent, by weight, based on total surface size and acrylamide polymer, preferably from about 2.0 to about 5.0 percent by weight, based on total surface size and acrylamide polymer. When crosslinker is added to a liquid medium such as an aqueous starch solution or water, the amount of crosslinking agent used may be based on starch pickup or water pick-up; typically amounts of crosslinker applied to paper or board are those known in the art and preferably the amount ranges from about 0.02 to about 10 pounds of crosslinking agent per ton of paper or paperboard, though this range may vary.

Generally, surface treatment may be applied to paper as either a post production operation or as a portion of the paper-making process itself. Surface size is applied typically in the papermaking process after the paper sheet has been formed and dried but not passed through a calendar stack. The formed and dried sheet (web) is conducted through a size press (actually a blade, rod or roll coater of various configurations) which re-wets the sheet to some degree (depending on the type of size press) with a liquid medium such as starch solution or a starch/surface size solution, or a water/surface size solution. Upon the wetting of the web, it is again dried and subsequently passed through a series of nips at the calendar to control caliper and smoothness in the finished sheet prior to wind-up, slitting or sheeting.

In yet another embodiment of the instant invention, methods for improving the printability and/or strength of paper or board, generally printing paper or board, are provided by applying to the surface of paper or board, the mixtures of the above described surface size compounds and substantially hydrophilic polyacrylamide in the ratios described above. The polyacrylamide/surface size containing compositions are generally applied to base sheets or pre-formed paper or board (or webs) at the dry end of the papermaking process using a size press, calendar spray boom, or the like. The size press is most common; however, the calendar, or calendar stack has been used with paperboard. Any size press designs may be used, including but not limited to horizontal press, vertical press, gate roll size press and metering blade size press, rod, puddle type, or combinations thereof. The compositions may also be sprayed onto the paper or board surface, optionally with a crosslinking or other auxiliary material. It is important that the compositions of the instant invention are added after the paper or board is formed in the papermaking process, for example at the size press. When applied to paper or board using a liquid medium, such as starch solution or water, the polyacrylamide/surface size mixture amount to be used generally depends on starch pick-up or water pick-up, and may vary though preferably amounts sufficient to provide from. about 0.5 to about 15 pounds of polyacrylamide/surface size per ton of paper or board, preferably from about 1 to-about 10 pounds polyacrylamide/surface size per ton of paper or board. Depending on the means used for applying the surface size polyacrylamide mixtures to paper or board (e.g., size press or calendar) and design of such, the compositions or mixtures added to the paper or board may be diluted to about 0.5 to about 6 percent solids. Optionally, the polyacrylamide/surface size containing compositions of the present invention may, prior to addition to the paper or board, be admixed with a liquid medium, such as water. The surface size/polyacrylamide compositions are added to liquid medium, typically contained in a size press or the like, to form a dilute mixture and paper sheets or pre-formed board is contacted with the dilute mixture or liquid medium containing surface size/polyacrylamide and optionally crosslinking agent. Preferably the liquid medium is water, more preferably an aqueous starch solution. Any type of starch may be used including cationic nonionic or anionic starch. Typical starch solutions range in concentration from about 3 to about 13 weight percent, preferably from about 6 to about 8 weight percent starch solids; however, these concentrations may vary depending on the type of size press. The ratio of liquid medium to polyacrylamide/surface size mixture may also vary depending on the paper grade and type of size press and type of liquid and the, sheet properties that are desired. Generally, however, the weight ratio of liquid medium to mixture comprising polyacrylamide/surface size ranges from about 70-99 parts liquid medium to about 30-1 part mixture comprising polyacrylamide/surface size, preferably from about-90-99 parts by weight liquid medium to about 10-1 part by weight mixture. Preferably, the weight ratio of aqueous starch solution (liquid medium) to surface size/polyacrylamide containing composition is from about 95-99 parts starch solution to about 5-1 parts mixture comprising surface size/polyacrylamide. If water is used as the liquid medium, preferred ratios are about 90-95 parts water to about 10-5 parts surface size/polyacrylamide containing composition. After or before adding the polyacrylamide/surface size mixture to a liquid medium such as water or aqueous starch solution to form a dilute mixture, it may be preferable to adjust the pH of the dilute mixture to from about 6 to about 11, preferably from about 7 to about 10, prior to contacting the dilute mixture with the pre-formed paper or. board. The pH of the dilute mixture may also be above about 8 to about 11.

After application of the polyacrylamide/surface size mixtures or dilute mixtures (further containing water or starch solution) to the paper or board, the paper or board is typically dried using drying means known in the art such as, for example, steam heated dryer cans, and infrared heaters. Any suitable drying temperature may be implemented and generally temperatures ranging from about 220OF to about 260° F., preferably from about 235° F. to about 255° F. are used.

Also provided by the instant invention are paper and board made according to the methods described above as well as paper and board which comprises the polyacrylamide/surface size compositions or mixtures described above including those which further contain an effective amount of crosslinking agent and/or stabilizing agent as described above. The paper and board comprises substantially near the surface, surface size comprising at least about 30, preferably at least about 40 mole percent hydrophobic groups and substantially hydrophilic polyacrylamide generally in a ratio of from about 30-95 parts by weight surface size to about 70-5 parts by weight polyacrylamide. As a result of addition at the dry end, the surface size and polyacrylamide are generally localized substantially on the paper or board surface as opposed to being uniformly distributed throughout the paper or board. The paper and board of the instant invention are especially designed for printing and are preferably uncoated. Paper and board of the instant invention may be acid, alkaline or neutral paper, through preferably alkaline. Preferably amounts of polyacrylamide/surface size range from about 0.5 to about 15 pounds of polyacrylamide/surface size per ton of paper or board, preferably from about 1 to about 10 pounds polyacrylamide/surface size per ton of paper or board. The invention is further illustrated by the following examples.

DESCRIPTION OF THE PREFERRED EMBODIMENTS

Preparation of Liquid Media (Aqueous Starch Solution)

To a stainless steel beaker, 233 grams (herein "parts") of a typical size press starch (containing about 0.17 mole percent cationic groups) was slurried in 767 parts of water with good agitation to from an aqueous starch slurry containing about 20 percent by weight starch. The temperature of the resulting slurry was then adjusted with steam to about 90°–95° C. Once steady state was achieved, the temperature was maintained for about 30 minutes. After that time, the heat was removed from the starch cooker and the resulting starch was placed in an ice-water bath. The temperature of the resulting solution was reduced to less than about 40° C. The starch solids were then adjusted to a final concentration of about 3 percent, by weight, with water. All applications or tubsizing herein (unless noted otherwise) were performed using 3 weight percent cooked starch solution.

EXAMPLE 1

A suitable vessel was fitted with a stirring apparatus, thermometer, a nitrogen inlet, and a water cooled reflux condenser and then placed in a heating bath. Addition ports to provide monomer feeds were fitted to the flask using a rubber septum.

The reaction vessel was charged with the requisite amount of water to effect a total solids of about 15 percent, by weight. The vessel was then heated to reflux at which time the monomer feed consisting of acrylamide (90 parts by weight) and acrylic acid (10 parts by weight) was fed into the refluxed reactor over a period of ninety minutes. Concurrently, a catalyst system was simultaneously added to the reactor to effect polymerization. After addition was completed, the temperature was maintained at reflux for an additional 30 minutes. The reactor was then cooled to ambient temperature. The resulting polymer contained about 10 weight percent acrylic acid or about 8 mole percent acrylic acid and had a solution pH of between about 4.5–5.5.

A styrene/acrylic acid copolymer was prepared according to the known procedures disclosed in U.S. Pat. No. 5,138, 004, which is incorporated herein by reference. The copolymer contained about 50 mole percent styrene and about 50 mole percent acrylic acid. Approximately 50 mole percent hydrophobic groups were present in the styrene/acrylic acid copolymer. The surface size/polyacrylamide composition of the instant invention was prepared by adding the above polyacrylamide solution to the styrene/acrylic copolymer. The weight ratios of styrene/acrylic surface size to polyacrylamide was about 55 parts styrene/acrylic to about 45 parts by weight polyacrylamide. Water was added to adjust the polymer solids to about 14 percent, by weight, total solids and the pH was adjusted to about 9.5.

EXAMPLE 2

A starch solution containing the surface size polyacrylamide mixture prepared in Example 1 was applied to base sheet paper containing no surface additives according to the following procedure.
Application Procedure:

600 parts of the above 3 percent starch solution was weighed into a stainless steel rectangular pan. An 8.5×11 inch sheet of alkaline base. paper is then drawn through the starch solution at an even speed to deposit starch on the surfaces (top and bottom) of the base sheet paper. The sheet weighed about 3.9 parts. The sheet is then blotted using waterleaf (blotter) paper and the weight of the blotted sheet is then recorded. The pickup weight of the starch-treated sheet is calculated by taking the difference between the weight of the dry sheet and the wet sheet. The starch pickup weight was 2.3 parts by weight. Pick-up weight for the blank was then used to calculate the amount of resin needed to be added for the rest of the testing. 5.5 parts of 24 weight percent solution of the surface sizing polyacrylamide mixture was added to the starch solution to provide about 1.0 part by weight surface size/polyacrylamide to the starch solution. The sheet was then pressed on a Noble and Wood press and drum dried at a temperature of about 245OF for 30 seconds. All measurements of strength and sizing were performed after conditioning the paper for 24 hours at constant temperature and humidity.

The sheets were then tested for strength using a Scott bond tester, TAPPI procedure #541, which is incorporated herein by reference. The internal bond-of the paper averaged 138 mil-ft-lbs.

EXAMPLE 3

A commercially available sodium salt of styrene maleic acid copolymer ("SMA") which is made from styrene and maleic anhydride comonomers was obtained which contained approximately 50 mole percent hydrophobic groups. An acrylamide/acrylic acid copolymer prepared as in Example 1 was added to the SMA; the ratio of SMA to polyacrylamide was 65 parts by weight SMA to 35 parts by weight polyacrylamide. The procedure in Example 1 was followed except that the polymer solids were adjusted to about 15 percent by weight and the pH of the mixture was adjusted to about 9.5.

EXAMPLE 4

To 600 parts of the above described 3 percent by weight aqueous starch solution, 5.5 parts of a 24 percent solution (1.0 part by weight active) of the SMA/polyacrylamide mixture prepared in Example 3 was added. The starch pick-up was about 2.3 parts by weight. The aforesaid mixture was then applied to basesheet paper according to the application procedure in Example 2. The sheets were then tested for strength using a Scott bond tester, TAPPI procedure #541. The internal bond of the paper averaged 155 mil-ft-lbs.

EXAMPLE 5

Following the procedure of Example 2, various surface size agents were added to 600 parts of 3 percent by weight aqueous starch solution samples and the aforesaid was applied to basesheet paper according to the application procedure described above. The starch pick-up was about 2.3 parts by weight. The amount of surface size added was 1.0 part by weight. Internal bond strength of the resulting paper samples was measured and appears in Table 1 along with internal bond strength measurements for paper sized with the polyacrylamide surface sizing mixtures of the instant invention. The results demonstrate that use of surface size/polyacrylamide provides significantly improved strength compared to the use of surface size agents alone.

TABLE 1

| Paper Additive | Internal Bond (mil-ft-lbs) |
|---|---|
| *SMA | 115 |
| *Styrene Acrylic | 122 |
| *Styrene Acrylate salt Na | 118 |
| Example 3 | 155 |
| Example 1 | 138 |

*COMPARATIVE

EXAMPLE 6

The procedures in Examples 1 and 2 were followed to produce paper impregnated with a styrene/acrylic acid polyacrylamide mixture of the instant invention, except that 5.6 parts by weight of Ammonium Zirconium Carbonate (AZC) was added to the starch solution. The surface size/polyarcylamide was added to the starch solution first followed by the AZC. The starch pickup was 2.3 parts by weight. The internal bond strength of the resulting paper was 182 mil-ft-lbs.

EXAMPLE 7

The procedures in Examples 3 and 4 were followed to produce paper with SMA/polyacrylamide mixture of the instant invention, except that 5.6 parts of AZC was added to the starch solution after the addition of the SMA/polyacrylamide. The pickup was 2.3 parts by weight. The internal bond strength of the resulting paper was 195 mil-ft-lb.

EXAMPLE 8

Following the procedure in Example 5, SMA, styrene acrylic acid copolymer and styrene acrylate salt surface size agents were added in amounts of 1.0 part, by weight surface size to 600 parts of 3 percent aqueous starch solution, except that 5.6 parts by weight of AZC was added to the starch solution after the addition of the surface size. The dilute mixture was applied to the paper according to the above application procedure and the internal bond measured using a Scott bond tester. Internal bond measurements appear in Table 2, along with internal bond measurements for mixtures prepared in Examples 6 and 7. The results demonstrate that a crosslinker significantly enhances the improved bond strength produced by the surface size/polyacrylamide mixtures of the instant invention.

TABLE 2

| Paper Additive | Internal Bond |
|---|---|
| *SMA | 118 |
| *Styrene Acrylic | 122 |
| *Styrene Acrylate salt Na | 122 |
| Example 7 | 195 |
| Example 6 | 182 |

*COMPARATIVE EXAMPLES

EXAMPLES 9–10

The general procedure in Example 2 was followed for incorporating various surface sizing or dry strength resins into paper samples used for comparative testing. For Examples 9 and 10 two surface size polyacrylamide mixtures were prepared following the procedures in Examples 3 and 1 respectively. Example 9 contained 65 parts SMA and 35 parts by weight acrylamide acrylic acid copolymer. Example 10 contained 55 parts styrene acrylic and 45 parts by weight acrylamide acrylic acid copolymer. The acrylamide/acrylic acid copolymer used in both examples was prepared as in Example 1 and contained about 8 to about 10 mole percent acrylic acid. In certain instances 5.6 parts of AZC was added after addition of the surface size, polyacrylamide or surface size polyacrylamide mixture. Wax pick, an indicator of surface strength (higher number indicating more surface pick resistance), was measured for each paper sample as in TAPPI test procedure: T 459 which is incorporated herein by reference. The data is set forth in Table 3.

TABLE 3

| PAPER ADDITIVE | AZC (Yes/No) | Wax Pick # |
|---|---|---|
| *No Sizing or Dry strength | Yes | 13 |
| *Styrene Acrylate salt Na | No | 12 |
| *Styrene Acrylate salt Na | Yes | 16 |
| Polyacrlyamide | No | 14 |
| *Polyacrylamide | Yes | 16 |
| Example 9 | No | 12 |
| Example 9 | Yes | 16 |
| Example 10 | No | 16 |
| Example 10 | Yes | 18 |

*COMPARATIVE

EXAMPLES 11–12

For Examples 11 and 12 two surface size/polyacrylamide compositions were prepared following Examples 3 and 1 and were incorporated into paper according to the procedure in Examples 4 and 2 respectively. Example 11 contained 65 parts SMA and 35 parts by weight of acrylamide/acrylic acid copolymer. Example 12 contained 55 parts styrene acrylic and 45 parts by weight acrylamide/acrylic acid copolymer. The acrylamide/acrylic acid copolymer was prepared according to the procedure in Example 1 and contained about 8 mole percent acrylic acid. Styrene acrylate sodium salt ("SA"), polyurethane and alkyl ketene dimer ("AKD") surface sizes were each incorporated into paper samples by adding an amount of 1.0 part by weight to the liquid medium following the procedure in Example 2.

The resulting paper samples were then printed using non-impact printing techniques (Hewlett Packard DeskJet 500C printer). The sheets were printed in both monochrome and color ink using the Hewlett Packard Paper Acceptance criteria for HP DeskJet 500L, 500C, 560C printers. The printed sheets were then tested for various print quality parameters. Optical density, dry time and wicking test criteria were measured according to the Hewlett Packard paper acceptance booklet.- Color bleed of the sheet was measured using the Olympus Cue-2 Morphometry program. This test measured the percent of a specific black letter on the color test sheet on a yellow background. The bleed through of the paper was quantitatively analyzed by looking at the back-side of the 100 percent rectangle on the Monochrome test sheet. A number from 1 to 5 was assigned for each of the tests with 1 considered as poor and 5 considered as excellent. A sheet given a number 3 for any test was considered average. Table 4 summarizes the various print quality parameters for each paper sample.

TABLE 4

|  | Example 11 | Example 12 | *SA | *Polyurethane | *AKD |
|---|---|---|---|---|---|
| Dry time | 4 | 5 | 3 | 4 | 1 |
| Bleed through | 3 | 5 | 2 | 3 | 5 |
| Optical Density | 5 | 5 | 5 | 5 | 4 |
| Color Bleed | 4 | 5 | 5 | 3 | 2 |

*COMPARATIVE

EXAMPLE 13

The procedure in Example 2 was used to impregnate into paper samples various surface size materials as well as surface size/polyacrylamide compositions prepared according to Examples 1 and 3. The amounts of surface size/polyacrylamide mixture, styrene acrylic acid, polyurethane and alkene ketene dimer were about 1.0 part by weight. Paper samples were then tested for toner adhesion. The toner adhesion test measures the amount of reprographic toner that remains after distortion on a copied image. The test was performed using a Olympus Cue-2 Morphometry program that qualitatively measures the white area made by folding and creasing the copied image. A number from 1 to 5 was assigned for each of the tests, with 1 considered poor and 5 considered excellent. A sheet given a number 3 for any test was considered average. Table 5 summarizes the results and demonstrates that the surface size/polyacrylamide sizing agents of this invention provide improved toner adhesion.

TABLE 5

| Paper Additive | Toner Adhesion |
|---|---|
| Example 3 | 5 |
| Example 1 | 5 |
| *Styrene Acrylic | 5 |
| *Polyurethane | 2 |
| *Alkene ketene dimer | 2 |

*COMPARATIVE

EXAMPLE 14

The procedure in Examples 1 and 2 were followed to produce paper impregnated with a composition containing styrene acrylic copolymer and polyacrylamide, except that 600parts of water was used as the liquid medium instead of the 3 percent starch solution. Four different dosages of the styrene acrylic/polyacrylamide were added to the water. The mixture contained 55 parts of styrene acrylic and 45 parts by weight polyarylamide/acrylic acid copolymer. Sizing was measured using a water absorbency drop test according to the following general procedure: water (pH 7) was applied to paper using a micro syringe (5.0 microliters) to form one drop on the paper. The time period in which the water drop completely absorbed into the paper was measured in seconds. Table 6 summarizes the results, which demonstrate that the surface size/polyacrylamide compositions of the instant invention provide improved sizing, particularly when compared to the data in Table 7 below.

TABLE 6

| Dosage (parts polymer) | Water drop (secs) |
|---|---|
| 0.2 | 32 |
| 0.4 | 29 |
| 0.8 | 40 |
| 1.4 | 57 |
| 2.8 | 70 |

EXAMPLE 15

Example 14 was repeated except styrene acrylic copolymer and a polyacrylamide were individually applied to separate paper samples, instead of the styrene acrylic/polyacrylamide mixture. Water drop test data was obtained as described in Example 14 and the results which appear in Table 7 demonstrate that the use of the surface size/polyacrylamide mixtures of the instant invention (as shown in Table 6) provide superior sizing compared to the individual components.

TABLE 7

| Dosage (parts polymer) | Water Drop Penetration Styrene acrylic (secs) | Water Drop Penetration Polyacrylamide (secs) |
|---|---|---|
| 0.2 | 29 | 21 |
| 0.4 | 24 | 26 |
| 0.8 | 33 | 32 |
| 1.4 | 34 | 28 |
| 2.8 | 38 | 35 |

All of the above mentioned patents and publications are incorporated herein by reference. Variations of the present invention will suggest themselves to those skilled in this art in light of the above detailed description. Variations and modifications to the compositions and methods of the instant invention can be made by one skilled in the art without departing from the spirit or scope of the invention as defined in the claims set forth below.

What is claimed is:

1. A composition consisting essentially of a mixture of:
   (i) a synthetic, carboxylated surface size containing at least about 40 mole percent hydrophobic groups and at least about 25 mole percent of carboxylatd groups selected from the group consisting of hydrolyzed styrene-maleic anhydride copolymers, styrene-maleic acid salt copolymers, styrene-(meth)acrylate copolymers, styrene-(meth)acrylic acid copolymers, and acrylonitrile-(meth)acrylate salt copolymers;
   (ii) a substantially hydrophilic polyacrylamide, wherein the ratio of said surface size to said polyacrylamide is from about 30-95 parts by weight surface size to about 70-5 parts by weight polyacrylamide; and
   (iii) a crosslinking agent.

2. A composition according to claim 1 wherein said crosslinking agent is water soluble.

3. A composition according to claim 1 wherein said crosslinking agent is selected from the group consisting of zirconium salts, hafnium salts, and titanium salts.

4. A composition according to claim 1 wherein said crosslinking agent is ammonium zirconium carbonate.

5. A composition according to claim 1 wherein said crosslinking agent is a glyoxylated polymer.

6. A composition according to claim 1 wherein said crosslinking agent is selected from the group consisting of glyoxylated vinylamide polymers, formaldehyde, melamine-formaldehyde condensation polymers, and glyoxyl extended materials.

7. A composition according to claim 1 wherein the percentage of crosslinking agent in said composition ranges from about 0.3 to about 10 percent, by weight of the total weight of said surface size and said polyacrylamide.

8. A composition according to claim 7 wherein the percentage of crosslinking agent in said composition ranges from about 2 to about 5 percent, by weight of the total weight of said surface size and said polyacrylamide.

9. A composition according to claim 1 wherein said surface size is a styrene acrylic acid copolymer.

10. A composition according to claim 1 wherein said polyacrylamide is selected from the group consisting of copolymers of acrylamide and an acrylate salt, copolymers of acrylamide and acrylic acid, acrylamide homopolymer, crosslinked polyacrylamide, and copolymers of acrylamide and diallyldimethylammonium chloride.

11. A composition according to claim 1 wherein said polyacrylamide has a molecular weight of at least about 50.(00.

12. A composition according to claim 1 wherein said polyacrylamide comprises a copolymer of an (alk) acrylamide monomer and a cationic monomer.

13. A composition according to claim 1 wherein said polyacrylamide comprises a copolymer of an (alk) acrylamide monomer and an anionic monomer.

14. A composition according to claim 1 wherein said polyacrylamide comprises a substantially hydrophilic anionic polyacrylamide.

15. A composition according to claim 1 wherein said polyacrylamide comprises a substantially hydrophilic ionic polyacrylamide.

16. A composition according to claim 1 wherein said polyacrylamide comprises a substantially hydrophilic cationic polyacrylamide.

17. A composition according to claim 1 wherein the percentage of solids in said composition ranges from about 0.5 to about 30 weight percent solids, based on the total weight of said mixture.

18. A composition according to claim 1 having a pH of from about 9.0 to about 11.0.

19. A composition according to claim 1 wherein the ratio of surface size to polyacrylamide is from about 40-70 parts by weight surface size to about 60-30 parts by weight polyacrylamide.

20. A composition according to claim 3 wherein said crosslinking agent is a zirconium salt.

\* \* \* \* \*